May 4, 1937.  W. H. McKISSICK  2,079,299
SHEAVE BLOCK
Filed May 8, 1936

INVENTOR
W<sup>m</sup> H. McKissick
BY Barry & Cyr
ATTORNEYS

Patented May 4, 1937

2,079,299

UNITED STATES PATENT OFFICE 2,079,299

SHEAVE BLOCK

William H. McKissick, Tulsa, Okla.

Application May 8, 1936, Serial No. 78,717

7 Claims. (Cl. 254—190)

My invention relates to sheave block structures and relates particularly to an improved form of sheave pin for use with such structures.

A principal object of my invention is to provide a simple form of sheave pin which is adapted to retain the side members of the block in operative assembly and to enter into locking engagement with said side members to secure said sheave pin against rotation or separation into its component parts during the operation of the block. Other and more specific objects and advantages will appear from a consideration of the invention set forth below.

Figure 1:
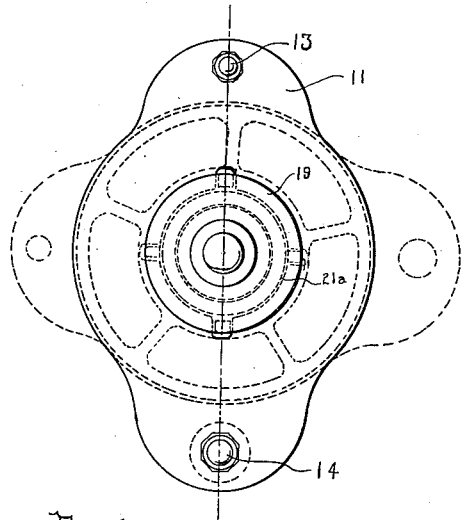
Figure 2:
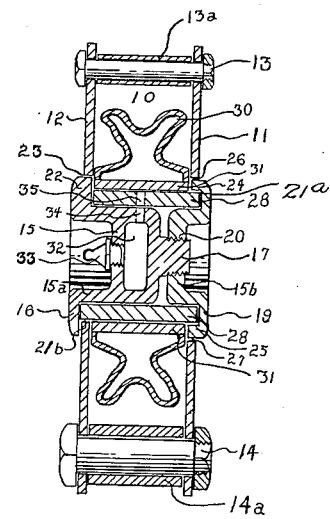
Figure 3:
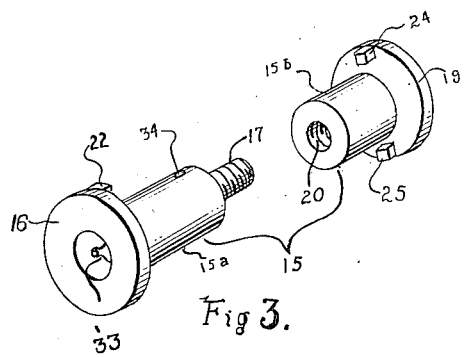
Figure 4:
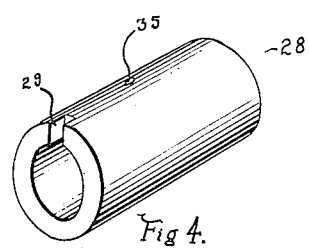
Figures 5, 6:
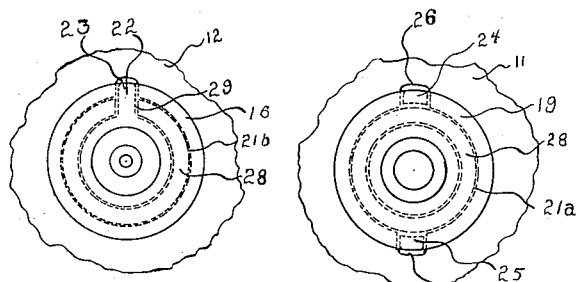

In the accompanying drawing showing one form of my invention; Fig. 1 shows an elevation of a sheave block showing in dotted lines one side rotated through 90° for assembly or disassembly; Fig. 2 is a cross section on the center line of Fig. 1; Fig. 3 is a perspective view of the sheave pin showing its component parts separated from each other; Fig. 4 is a perspective view of the sleeve bushing which is mounted on the sheave pin when assembled; Fig. 5 is a fragmentary view of the central portion of the outside of the left hand face of the block; and Fig. 6 is a similar view of the right hand face of the block.

Like reference characters indicate like parts throughout the drawing.

A sheave block 10 comprises side plates 11 and 12, forming the right and left hand sides (Fig. 2) respectively thereof, which are retained in operative relation at their upper and lower ends respectively by bolts 13 and 14 which pass through respective spacers 13a and 14a for holding the sides 11 and 12 a desired distance apart. A sheave pin 15 consisting of a male member 15a having an extended flange 16 at its outer end and a reduced threaded portion 17 at its inner end and a female member 15b likewise having an extended flange 19 at its outer end and internal threads 20 in its inner end for engaging the threaded portion 17 passes through openings 21a and 21b, respectively, in the block plates 11 and 12, the flanges 16 and 19 bearing against the outer faces thereof to retain said plates against spreading when the block is assembled. A key 22 attached to or formed in the inner face of flange 16 engages a complementary slot 23 in plate 12 and keys 24 and 25 on the inner face of flange 19 likewise engage similar slots 26 and 27 in plate 11. The keys 22 and 24, 25 cooperating with slots 23 and 26, 27, respectively, to prevent turning of the corresponding members 15a and 15b of sheave pin 15 when the block is assembled. A sleeve bushing 28 having a slot 29 in the end thereof is mounted on sheave pin 15, the slot 29 engaging key 22 to prevent turning of bushing 28 on the sheave pin 15. A sheave 30 having a bearing 31 in the hub thereof rolls on bushing 28. For the purpose of lubrication, member 15a contains a hollow space 32 into which a lubricating fitting 33, such as an Alemite fitting, is fixedly inserted through the center of sheave pin member 15a. A bore hole 34, in the side of member 15a, registers with a bore hole 35 in the bushing 28 thus providing a passageway for lubricant from space 32 to the surface of bushing 28 for lubrication between bushing 28 and the inner surface of bearing 31.

The block is assembled in the following manner. The male member 15a is inserted by its threaded end 17 through opening 21b in side plate 12 until key 22 engages slot 23. Bushing 28 is then slipped over member 15a and slot 29 brought into engagement with key 22. Opening 21b is sufficiently large to receive the end of bushing 28 which then bears against the inner surface of flange 16. The upper portion of key 22 is thus in engagement with slot 23 and the lower portion of slot 29. Sheave 30 is then slipped over bushing 28. Bushing 28 is longer than the width of the hub of sheave 30 by substantially the thickness of plates 11 and 12 and when sheave 30 is in place bushing 28 extends through the hub thereof and for a short distance therebeyond. Female member 15b is then inserted into plate 11 until the lugs 24 and 25 enter the notches 26 and 27. Then the inner end of the member 15b is inserted into the bushing 28 and the threads 20 are engaged with the threads 17 and the parts are screwed up until the right-hand end of the bushing enters the opening 21a in plate 11. As a result of said engagement, plate 11 may be operated as a wrench to draw together members 15a and 15b until the desired degree of tightness of the assembly through the hub of sheave 30 is attained. In every case plate 11 being turned until proper registration of plate 11 with plate 12 is obtained, whereupon, bolts 13 and 14 are inserted through their respective spacers 13a and 14a and the assembly of the block completed. As noted above, bushing 28 is longer than the width of the hub of sheave 30 by the thickness of plates 11 and 12 and therefore extends through openings 21a and 21b in plates 11 and 12, respectively, and bears against the inner surfaces of flanges 16 and 19. This allows sheave 30 to roll freely on bushing 28 without binding against plates 11 and 12 and any amount of play for this purpose may be provided by the extent to which members 15a and 15b are drawn up.

When the assembly is thus completed, it will be apparent that, by means of my improved sheave pin, the block assembly may be held together in a simple and practical manner, and the sheave pin itself, as a result of its novel construction, is locked into the side plates so that it cannot come apart or become unscrewed without disassembling the entire block. This locking feature, therefore, adds an important factor of safety to the construction and operation of sheave blocks.

It will be evident that various changes in the size and shape of the various parts and various alterations and modifications may be made without departing from the scope of my invention as set forth in the appended claims. For example, the keys 22, 24 and 25, instead of being formed in or attached to the flanges 16 and 19, may be located on the shanks of the members 15a and 15b. Also these keys may be formed in the sides of the block openings 21a and 21b and the members 15a and 15b slotted correspondingly.

What I claim is:

1. In a sheave block, a pair of side plates, a sheave arranged between the side plates, a sheave pin extending through said plates and said sheave and comprising separable members, means for joining said members together at their inner ends, flanges at the outer ends of said members adapted to bear against said plates, means cooperating between said members and said plates to secure said members against rotation relative to said plates, and means to prevent said relative rotation of said plates after the block is assembled.

2. In a sheave block, a pair of side plates, a sheave arranged between the side plates, a sheave pin, extending through said plates and said sheave and comprising separable members, means for joining said members together at their inner ends, flanges at the outer ends of said members adapted to bear against said plates, means cooperating between said members and said plates to secure said members against rotation relative to said plates, spacing means between said plates, and means to prevent relative rotation of said plates after said block is assembled.

3. In a sheave block, a pair of side plates, a sheave arranged between the side plates, a sheave pin extending through said plates and said sheave and comprising separable members, a sleeve mounted on said sheave pin, means for joining said members together at their inner ends, flanges at the outer ends of said members adapted to bear against said plates, means cooperating between said members, said sleeve and said plates to secure said members and said sleeve against rotation relative to said plates, and means to prevent said relative rotation of the plates after the block is assembled.

4. In a sheave block, a pair of side plates, a sheave arranged between said side plates, a sheave pin extending through said plates and said sheave and comprising separable members, each member being interlocked with one of said side plates, a threaded joint connecting the inner ends of said members, flanges at the outer ends of said members to prevent the plates from moving away from one another, a bushing arranged between said sheave pin and said sheave, forming a bearing for the latter and interlocked with one of said members, an auxiliary means locking said plates against relative rotation.

5. A sheave block comprising side plates, a sleeve extending between said plates, a pin consisting of separable members extending through said sleeve and detachably connected together, said pin having flanged ends to prevent movement of the plates away from one another, the members of the pin having lugs interlocked with the plates and with said sleeve, a sheave block arranged between the plates and rotatably mounted on the sleeve, and auxiliary means detachably connecting the plates and preventing relative rotation of the latter.

6. A sheave block comprising first and second side plates having apertures, a sleeve extending between said plates and having its ends extending into said apertures, a pin including first and second members extending into said sleeve and detachably connected together, the first member of the pin being interlocked with the first plate and sleeve and having a flange overlapping a portion of the first plate to limit movement of the first plate in a direction away from the second plate, the second member of the pin being interlocked with the second plate and having a flange overlapping a portion of the second plate to limit movement of the second plate in a direction away from the first plate, a sheave rotatably mounted on the sleeve and arranged between the plates, and means detachably connecting the plates together and preventing relative rotation of the plates about the axis of the sleeve.

7. A sheave block comprising spaced side plates, a pin consisting of a plurality of members threadably connected together and provided with end flanges for limiting the movement of the plates away from one another, a sleeve surrounding the pin, the members of said pin being interlocked with said plates and sleeve for preventing relative rotation of said plates, sleeve and members, a sheave arranged between the plates and rotatably mounted on the sleeve, and auxiliary means detachably connecting the plates and preventing relative rotation of the plates.

WILLIAM H. McKISSICK.